(12) United States Patent
Reichenbach-Klinke et al.

(10) Patent No.: US 9,409,820 B2
(45) Date of Patent: Aug. 9, 2016

(54) USE OF CSH SUSPENSIONS IN WELL CEMENTING

(75) Inventors: Roland Reichenbach-Klinke, Traunstein (DE); Luc Nicoleau, Altenmarkt an der Alz (DE)

(73) Assignee: BASF SE, Ludwigshafen (DE)

(*) Notice: Subject to any disclaimer, the term of this patent is extended or adjusted under 35 U.S.C. 154(b) by 265 days.

(21) Appl. No.: 13/082,483

(22) Filed: Apr. 8, 2011

(65) Prior Publication Data
US 2011/0263749 A1    Oct. 27, 2011

Related U.S. Application Data

(60) Provisional application No. 61/326,253, filed on Apr. 21, 2010.

(51) Int. Cl.
*C09K 8/00* (2006.01)
*E21B 33/13* (2006.01)
*C04B 24/26* (2006.01)
*C04B 28/02* (2006.01)
*C09K 8/467* (2006.01)

(52) U.S. Cl.
CPC .......... *C04B 24/267* (2013.01); *C04B 24/2647* (2013.01); *C04B 28/02* (2013.01); *C09K 8/467* (2013.01)

(58) Field of Classification Search
CPC .................................................. C04B 24/2647
USPC ......................................................... 523/130
See application file for complete search history.

(56) References Cited

U.S. PATENT DOCUMENTS

| | | | |
|---|---|---|---|
| 4,883,125 A | 11/1989 | Wilson et al. | |
| 5,695,811 A * | 12/1997 | Andersen et al. | 427/133 |
| 5,709,743 A | 1/1998 | Leture | |
| 5,820,670 A | 10/1998 | Chatterji et al. | |
| 6,626,243 B1 * | 9/2003 | Go Boncan | 166/293 |
| 6,641,661 B1 * | 11/2003 | Jardine et al. | 106/802 |
| 6,953,090 B2 | 10/2005 | Vijn et al. | |
| 7,041,167 B2 | 5/2006 | Jiang | |

(Continued)

FOREIGN PATENT DOCUMENTS

| | | | |
|---|---|---|---|
| DE | EP 0990627 A1 * | 4/2000 | C04B 28/026 |
| EP | 1 375 819 A1 | 1/2004 | |

(Continued)

OTHER PUBLICATIONS

Rohrbach et al., EP 0990627 A1 machine translation in English, Apr. 5, 2000.*

(Continued)

*Primary Examiner* — David Karst
(74) *Attorney, Agent, or Firm* — Oblon, McClelland, Maier & Neustadt, L.L.P.

(57) ABSTRACT

Methods of a setting accelerator composition for inorganic binders which comprises at least one water-soluble comb polymer suitable as a superplasticizer for hydraulic binders and calcium silicate hydrate particles in the development, exploitation and completion of underground mineral oil and natural gas deposits and in deep wells which not only accelerates the setting and hardening of the cement slurries but also shortens the time in which the static gel strength of the hardening cement slurries increases from 100 lb/100 ft$^2$ (4.88 kg/m$^2$) to 500 lb/100 ft$^2$ (24.4 kg/m$^2$).

23 Claims, 1 Drawing Sheet

Time in hours

(56) References Cited

U.S. PATENT DOCUMENTS

| | | |
|---|---|---|
| 7,086,466 B2 | 8/2006 | Roddy |
| 7,174,962 B1 | 2/2007 | Roddy et al. |
| 7,213,646 B2 | 5/2007 | Roddy et al. |
| 7,341,104 B2 | 3/2008 | Roddy |
| 7,424,913 B2 | 9/2008 | Roddy |
| 7,559,369 B2 | 7/2009 | Roddy et al. |
| 2002/0166479 A1 | 11/2002 | Jiang |
| 2004/0149172 A1* | 8/2004 | Jardine et al. ............ 106/724 |
| 2006/0107874 A1* | 5/2006 | Castaing et al. ........... 106/638 |
| 2007/0102160 A1 | 5/2007 | Jones et al. |
| 2007/0151483 A1* | 7/2007 | Kato et al. ............... 106/638 |
| 2008/0066650 A1* | 3/2008 | Dubey ...................... 106/705 |
| 2008/0115938 A1 | 5/2008 | Bray |
| 2009/0260544 A1 | 10/2009 | Roddy et al. |
| 2010/0016183 A1 | 1/2010 | Roddy |
| 2011/0132605 A1 | 6/2011 | Sarap et al. |
| 2012/0152540 A1 | 6/2012 | Patil et al. |

FOREIGN PATENT DOCUMENTS

| | | |
|---|---|---|
| WO | WO 2006/138277 A2 | 12/2006 |
| WO | WO 2010/026155 A1 | 3/2010 |
| WO | 2011029711 A1 | 3/2011 |

OTHER PUBLICATIONS

Nelson, Well Cementing, Schlumberger Educational Services, (1990)—Chapter 3-3.

Thomas, et al. "Influence of Nucleation Seeding on the Hydration Mechanisms of Tricalcium Silicate and Cement", J. Phys. Chem. 113 (2009), pp. 4327-4334.

Alizedeh, et al. "Hydration of tricalcium silicate in the presence of synthetic calcium-silicate-hydrate", J. MAter. Chem., 19 (2009), pp. 7937-7946.

Magarotto, Roberta "X-SEED Crystal Speed Hardening. The Mechanism of Action", BASF Press Conference, Trostberg, Germany, Oct. 6, 2009.

* cited by examiner

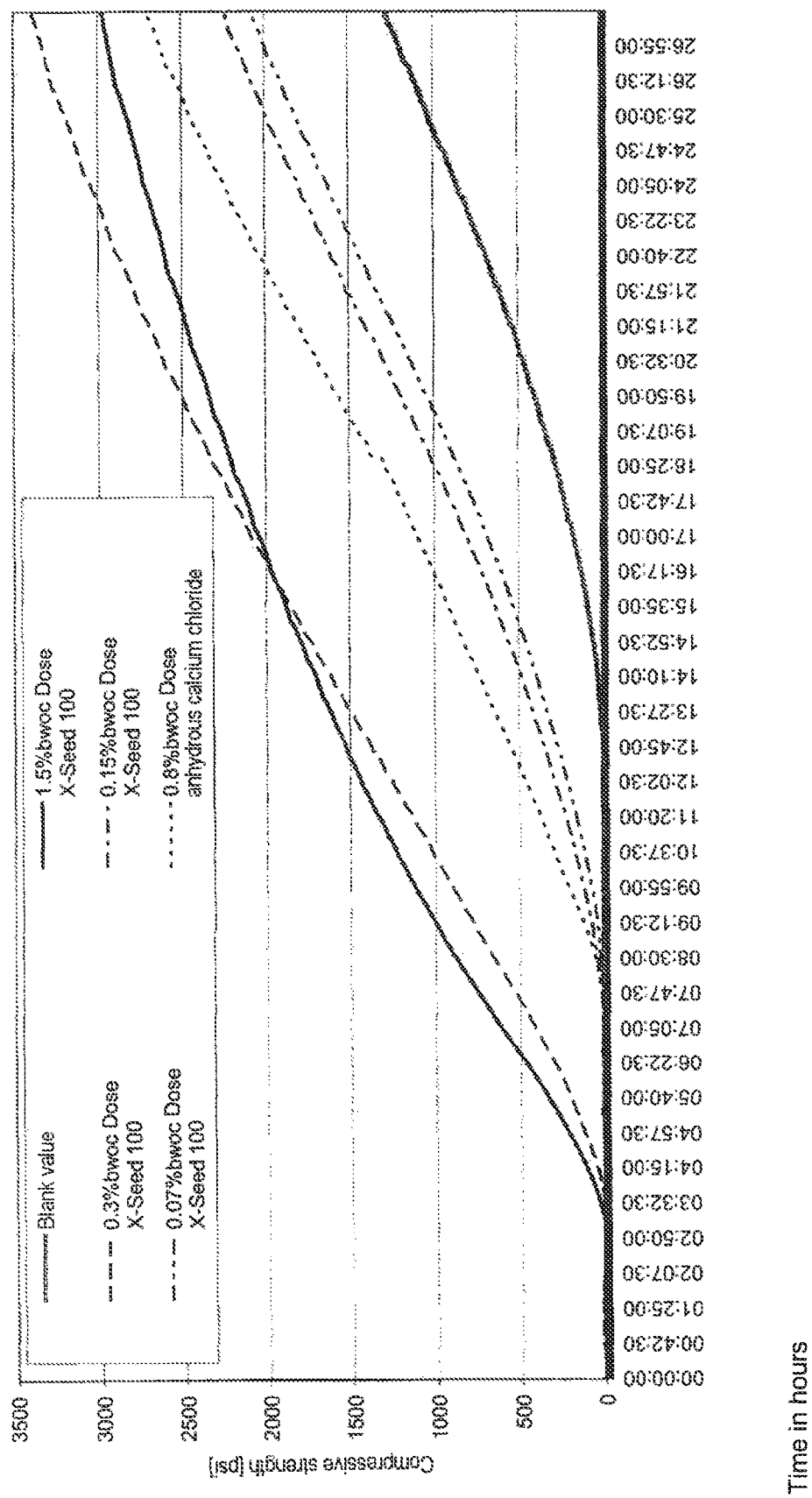

USE OF CSH SUSPENSIONS IN WELL CEMENTING

This patent application claims the benefit of U.S. provisional patent application Ser. No. 61/326,253 filed Apr. 21, 2010 incorporated in its entirety herein by reference.

The present invention relates to the use of CSH suspensions in the development, exploitation and completion of underground mineral oil and natural gas deposits and in deep wells.

Underground mineral oil, natural gas and water deposits are often under high pressure. Drilling in such formations requires that the pressure of the circulating well fluid be sufficiently high to counteract effectively the pressure of the underground formations and thus prevent the uncontrolled emergence of the formation fluids into the well.

As a rule, wells are lined section by section with steel pipes. The annular gap between the well casings and the underground formations is then filled with cement. This can be effected by forcing a cement slurry directly into the annular gap or through the well casing into the well in order then to flow backwards into this annular gap as a result of the pressure applied. The hardened cement firstly prevents formation fluids from emerging in an uncontrolled manner into the well and secondly prevents formation fluids from penetrating unhindered into other formations.

The temperature conditions of the deposits vary considerably. The temperatures in surface-near areas of permafrost regions, such as, for example, Alaska, Canada and Siberia, and in offshore wells at high latitudes may be below freezing point and may be up to 400° C. in the case of geothermal wells. For this reason, the setting behavior of the cement slurries used must always be adapted to the prevailing conditions. While retardants are generally required at elevated temperatures, setting accelerators often have to be used at low temperatures. Moreover, the use of superplasticizers and/or fluid loss additives known per se in the prior art in the cement slurries used can lead to a prolongation of the setting times, which likewise necessitates the use of accelerators.

According to Erik B. Nelson, Well Cementing, Schlumberger Educational Services, Sugar Land, Tex., 1990, chapter 3-3, calcium chloride is without a doubt the most frequently used, most effective and most economical setting accelerator for Portland cements. The $CaCl_2$ is as a rule used in concentrations of 2-4% bwoc (% by weight, based on the cement fraction). Unfortunately, the results are unforeseeable at concentrations above 6% bwoc, and premature setting reactions may occur. In addition, there is a risk of corrosion of the casing string by the chloride ions.

The object of the present invention was therefore substantially to avoid the disadvantages associated with the prior art. In particular, there was a need for alternative accelerators which do not have the above disadvantages.

This object was achieved by the features of claim 1. The dependent claims relate to preferred embodiments.

WO 2010/026155 A1 describes curing accelerator compositions which, in addition to a water-soluble comb polymer suitable as a superplasticizer for hydraulic binders, also comprise calcium silicate hydrate particles of suitable size (see for example claims 40 to 52 of the WO specification).

It has now surprisingly been found that such compositions can also be used as setting accelerator compositions for inorganic binders in the development, exploitation and completion of underground mineral oil and natural gas deposits and in deep wells.

The present invention accordingly relates to the use of a setting accelerator composition for inorganic binders which comprises at least one water-soluble comb polymer suitable as a superplasticizer for hydraulic binders and calcium silicate hydrate particles in the development, exploitation and completion of underground mineral oil and natural gas deposits and in deep wells.

The setting accelerator composition is used here either as a suspension, preferably as an aqueous suspension, or in powder form.

The comb polymer is preferably a copolymer which has side chains comprising polyether functions as well as acid functions, which are present on a main chain. It is obtainable, for example, by free radical copolymerization of acid monomers and polyether macromonomers, the copolymer as a whole comprising at least 45 mol %, preferably at least 80 mol %, of structural units derived from the acid monomers and/or the polyether macromonomers.

The comb polymer preferably comprises structural units derived from (meth)acrylic acid, maleic acid, polyalkylene glycol vinyl ethers, polyalkylene glycol allyl ethers and/or polyalkylene glycol (meth)acrylates. For a detailed discussion of suitable structural units, reference is made to claims 47 to 49 of WO 2010/026155 A1. Suitable comb polymers expediently have average molecular weights (Mw) of from 5000 to 200 000 g/mol, preferably from 10 000 to 80 000 g/mol and in particular from 20 000 to 70 000 g/mol, measured by means of gel permeation chromatography.

In addition to said comb polymer, polycondensates, in particular of the type disclosed in claims 28 to 33 and 50 of WO 2010/026155 A1, may also be present.

In the calcium silicate hydrate used, the molar ratio of calcium to silicon is preferably from 0.6 to 2.0, in particular from 1.1 to 1.8. The molar ratio of calcium to water in the calcium silicate hydrate is preferably from 0.6 to 6, particularly preferably from 0.6 to 2.0 and in particular from 0.8 to 2.0.

The calcium silicate hydrate particles used are expediently obtainable by reacting a water-soluble calcium compound with a water-soluble silicate compound, the reaction preferably taking place in the presence of an aqueous solution of the water-soluble comb polymer suitable as a superplasticizer for hydraulic binders. Regarding further details of a suitable preparation process, reference is made to claims 1 to 38 of WO 2010/026155 A1.

Suitable calcium silicate hydrate particles are expediently smaller than 5 µm, preferably smaller than 1 µm, more preferably smaller than 500 nm, particularly preferably smaller than 200 nm and in particular smaller than 100 nm.

Preferably, Portland cements, calcium aluminate cements, gypsum, anhydrite, blast furnace slag, slag sands, fly ashes, silica dust, metakaolin, natural and synthetic pozzolanas and/or calcined oil shale, preferably Portland cements, are suitable as inorganic binders whose setting is accelerated according to the invention.

These binders are expediently used in the form of a cement slurry, the water/cement value preferably being in the range from 0.2 to 1.0, in particular in the range from 0.3 to 0.6.

One field of use which is considered in particular according to the invention is well cementing of mineral oil and natural gas wells, in particular in permafrost regions and in the offshore sector.

Here, the use according to the invention accelerates the setting of the cement slurry. At the same time, the hardening rate of the cement slurry is advantageously increased. Moreover, the time in which the static gel strength of the hardening cement slurry increases from 100 lb/100 ft$^2$ (4.88 kg/m$^2$) to 500 lb/100 ft$^2$ (24.4 kg/m$^2$) is advantageously shortened. This is advantageous particularly in well cementing since the hardening cement slurry tends to crack in the middle range of gel strength owing to ascending gas bubbles. This range is passed through quickly according to the invention.

The setting accelerator composition is used according to the invention advantageously together with other additives customary in well cementing, in particular superplasticizers, water retention agents and/or rheology-modifying additives.

The present invention will now be explained in more detail on the basis of the following working example with reference to FIG. 1. Here:

FIG. 1 shows the increase in the compressive strengths of different cement slurries as a function of time.

USE EXAMPLE 1

The preparation of the cement slurries was effected according to API specification 10, section 5 and appendix A. For this purpose:
700 g of cement (Lafarge, class H)
266 g of tap water
3.5 g of Liquiment® K3F superplasticizer, product of BASF Construction Polymers GmbH)
3.5 g of Polytrol® FL 34 (fluid loss additive, product of BASF Construction Polymers GmbH)
1.0 g of tributyl phosphate (antifoam)
were homogeneously mixed. Either no additives (blank value), 0.80% bwoc of $CaCl_2$ or different amounts of X-Seed® 100 (product of BASF Construction Polymers GmbH; aqueous calcium silicate hydrate suspension, particle size <100 nm, solids content about 21% by weight, active proportion of calcium silicate hydrate about 7% by weight, comb polymers used: MVA2500 and EPPR312, likewise commercial products of BASF) were added to the samples. The X-Seed® 100 was added in an amount of 0.07% bwoc, 0.15% bwoc, 0.30% bwoc and 1.50% bwoc, based in each case on the active proportion of calcium silicate hydrate.

The samples were measured in a static gel strength analyzer (Chandler Engineering) at a temperature of 23° C. and a pressure of 1000 psi (about 69 bar). The time in which the static gel strength of the samples increased from 100 lb/100 ft$^2$ (4.88 kg/m$^2$) to 500 lb/100 ft$^2$ (24.4 kg/m$^2$) is stated in table 1

TABLE 1

| Sample | Time [min] |
|---|---|
| Blank value | 76.5 |
| 0.80% bwoc of $CaCl_2$ | 44.0 |
| 0.07% bwoc of X-Seed 100 | 52.5 |
| 0.15% bwoc of X-Seed 100 | 38.0 |
| 0.30% bwoc of X-Seed 100 | 13.5 |
| 1.50% bwoc of X-Seed 100 | 15.5 |

In addition, the variation of the compressive strength with time was measured. The results are shown in graphical form in FIG. 1.

It is evident that the calcium silicate hydrate suspension accelerates the increase in the compressive strength to a greater extent at lower dose than $CaCl_2$, at the same time the time in which the static gel strength of the samples passes through the critical range being substantially shortened.

We claim:

1. A method for accelerating the setting of a cement slurry comprising adding a sufficient amount of an accelerator composition to a cement slurry;
   wherein the cement slurry comprises water and an inorganic binder;
   wherein the accelerator composition comprises a water-soluble comb polymer; and particles consisting of calcium silicate hydrate, wherein said particles are smaller than 5 μm;
   wherein the comb polymer has a main chain;
   wherein the comb polymer has side chains comprising polyether functions and acid functions;
   wherein the side chains are present on the main chain; and
   wherein the inorganic binder comprises Portland cement.

2. The method of claim 1, wherein the time in which the static gel strength of the hardening cement slurry increases from 4.88 kg/m$^2$ to 24.4 kg/m$^2$ is shortened compared to the time in which the static gel strength of an identical hardening cement slurry that does not comprise the accelerator composition increases from 4.88 kg/m$^2$ to 24.4 kg/m$^2$.

3. The method of claim 1, wherein the setting accelerator composition is a suspension.

4. The method of claim 3, wherein the suspension is an aqueous suspension.

5. The method of claim 1, wherein the comb polymer is a copolymer which is obtained by free radical copolymerization of acid monomers and polyether macromonomers, the copolymer as a whole comprising at least 45 mol % of the acid monomer or the polyether macromonomer structural units.

6. The method of claim 1, wherein the comb polymer comprises at least one member selected from the group consisting of (meth)acrylic acid, maleic acid, a polyalkylene glycol vinyl ether, a polyalkylene glycol allyl ether and polyalkylene glycol (meth)acylate structural units.

7. The method of claim 1, wherein the comb polymer has an average molecular weight (Mw) of from 5,000 to 200,000 g/mol as measured by gel permeation chromatography.

8. The method of claim 1, wherein the calcium silicate hydrate has a molar ratio of calcium to silicon of from 0.6 to 2.0.

9. The method of claim 1, wherein the molar ratio of calcium to water in the calcium silicate hydrate is from 0.6 to 6.

10. The method of claim 1, wherein said particles are obtained by reacting a water-soluble calcium compound with a water-soluble silicate compound, wherein the reaction is effected in the presence of an aqueous solution of the water-soluble comb polymer.

11. The method of claim 1, wherein the inorganic binder further comprises at least one member selected from the group consisting of a calcium aluminate cement, anhydrite, blast furnace slag, slag sand, fly ash, silica dust, metakaolin, natural pozzolanas, synthetic pozzolanas and calcined oil shale.

12. The method of claim 1, wherein the inorganic binder further comprises calcined oil shale.

13. The method of claim 1, wherein said particles are smaller than 1 μm.

14. The method of claim 1, wherein the accelerating of the setting of the cement slurry occurs in an underground oil or natural gas well.

15. The method of claim 14, wherein the underground oil or natural gas well is offshore.

16. The method of claim 14, wherein the underground oil or natural gas well is in permafrost region.

17. The method of claim 14, wherein the underground oil or natural gas well is in a permafrost region or is offshore.

18. The method of claim 1, wherein said particles are smaller than 500 nm.

19. The method of claim 1, wherein hydrate said particles are smaller than 200 nm.

20. The method of claim 1, wherein said particles are smaller than 100 nm.

21. The method of claim 1, wherein the setting accelerator composition is a powder.

22. The method of claim 1, wherein the comb polymer comprises at least one member selected from the group consisting of a polyalkylene glycol vinyl ether and polyalkylene glycol (meth)acrylate structural units.

23. The method of claim 1, wherein the accelerating of the setting of the cement slurry occurs in an underground mineral oil, natural gas, or water deposit, wherein the deposit is under high pressure and varying temperature conditions.

* * * * *